COMMUNICATION STATION EMPLOYING AN ANTENNA ARRAY

Filed Oct. 31, 1962 3 Sheets-Sheet 1

INVENTORS J. C. SCHELLENG
L. C. TILLOTSON
BY
ATTORNEY

INVENTORS J. C. SCHELLENG
L. C. TILLOTSON
BY [signature]
ATTORNEY

COMMUNICATION STATION EMPLOYING AN ANTENNA ARRAY

Filed Oct. 31, 1962

INVENTORS J. C. SCHELLENG
L. C. TILLOTSON
BY E. W. Adams, Jr.
ATTORNEY

United States Patent Office 3,166,749

Patented Jan. 19, 1965

3,166,749

COMMUNICATION STATION EMPLOYING AN ANTENNA ARRAY

John C. Schelleng, Interlaken, and Le Roy C. Tillotson, Holmdel, N.J., assignors to Bell Telephone Laboratories, Incorporated, New York, N.Y., a corporation of New York Filed Oct. 31, 1962, Ser. No. 234,382

7 Claims. (Cl. 343—100)

This invention relates to communication stations, and specifically, to a communication station employing a self-steering antenna array.

An application of C. C. Cutler, R. Kompfner, and L. C. Tillotson, Serial No. 162,165, filed December 26, 1961 and assigned to the assignee of the present application, discloses a communication station having an antenna array that directionally transmits radio waves toward a remotely located source of radio waves impinging upon the array. According to reciprocity, for constructive interference, and thus directional transmission, of the energy radiated from the array toward the remote source to take place, the phase differences between the signals applied to the array elements for radiation are required to be equal in magnitude and opposite in sense to the phase differences between the portions of the impinging wave intercepted by the array elements from the remote source, assuming that transmission and reception are at the same frequency. In the above-mentioned application these conditions, and thus self-steering array performance, are achieved by a series of mixing and filtering operations repeated for each antenna element of the array. The remote source emits a pilot component (usually an unmodulated or "pure" sine wave signal) and an information component. The portion of the pilot component of the wave impinging upon each antenna element is mixed with the output from a local oscillator, the frequency of which is greater than that of the impinging wave. The phase of the resulting difference frequency sideband is equal in magnitude and inverted or opposite in sense to the phase of the intercepted portion. When mixed with the output of a source of signals to be conveyed to the remote source this sideband imparts to it the proper phase for radiation from the element toward the remote source. This sideband is also mixed with the information component intercepted by the array element and the resulting sum frequency sideband is in phase with, and is combined with similar portions of the information component received by the other antenna elements.

Wherever directional, line-of-sight communications are to be carried on between two points which are relatively movable in an unpredictable way, the Cutler-Kompfner-Tillotson communication station is potentially useful. Among such applications number communication satellites, cross-country radio relay repeaters in which the antenna towers are subject to large deflections, mobile radio stations, and scanning or tracking antennas. In many such applications frequency conversion of the information component from the radio frequency range to intermediate frequency would most likely be practiced. The Cutler-Kompfner-Tillotson application does not disclose any arrangements employing frequency conversion. To modify any of these arrangements to provide for frequency conversion is, of course, straightforward. But, since each antenna element has associated with it identical and complete transmitting and receiving circuitry, the addition of several components to the circuitry of each antenna element to implement frequency conversion in straightforward fashion greatly increases the over-all circuit complexity of the station.

It is, therefore, the object of the present invention to install intermediate frequency conversion in the Cutler-Kompfner-Tillotson communication station without appreciably increasing the circuit complexity thereof.

In accordance with the above object, a communication station is provided with an array of antenna elements that are irradiated by an incoming radio wave, comprising a pilot component and an information component, from a remotely located source. Both the information component and the pilot component of the portion of the impinging wave intercepted by each antenna element are mixed with the output from a local oscillator, the frequency of which is greater than that of the impinging wave. The resulting difference frequency sideband of the pilot component is inverted in phase as called for by the Cutler-Kompfner-Tillotson application and the difference frequency sideband of the information component is at an intermediate frequency, making for facility of handling. A portion of the pilot component sideband is mixed with information to be radiated from the array toward the remote source and the sum frequency sideband is applied to the antenna element. A second portion of the pilot component sideband is mixed with the modulation component and the resulting difference frequency sideband is in phase with, and thus can be combined additively with, similar portions derived from the other array elements.

These and other features of the invention will be understood more fully from the following detailed description taken in conjunction with the drawings in which.

Generally, a radio wave from a remote source that impinges upon an array of antenna elements is intercepted by the elements with phase differences dependent upon the angle of incidence of the wave and the placement of the antenna elements. According to reciprocity, in order to radiate a wave of the same frequency from the array toward the same remote source, the signals applied to the antenna elements must have phase differences which are equal in magnitude and opposite or inverse in sense to those between the intercepted portions of the impinging wave.

In the following discussion the signals of interest will be represented in the form $e^{j(\omega t-\theta)}$, where $\omega$ equals $2\pi$ times the frequency of the signal represented and $\theta$ equals the phase of the signal represented with respect to an arbitrary reference. The amplitude term will be dispensed with because it is not essential to an explanation of the mode of operation of the invention. It is understood that what is actually meant throughout is either the real or imaginary part of $e^{j(\omega t-\theta)}$.

Figure 2:
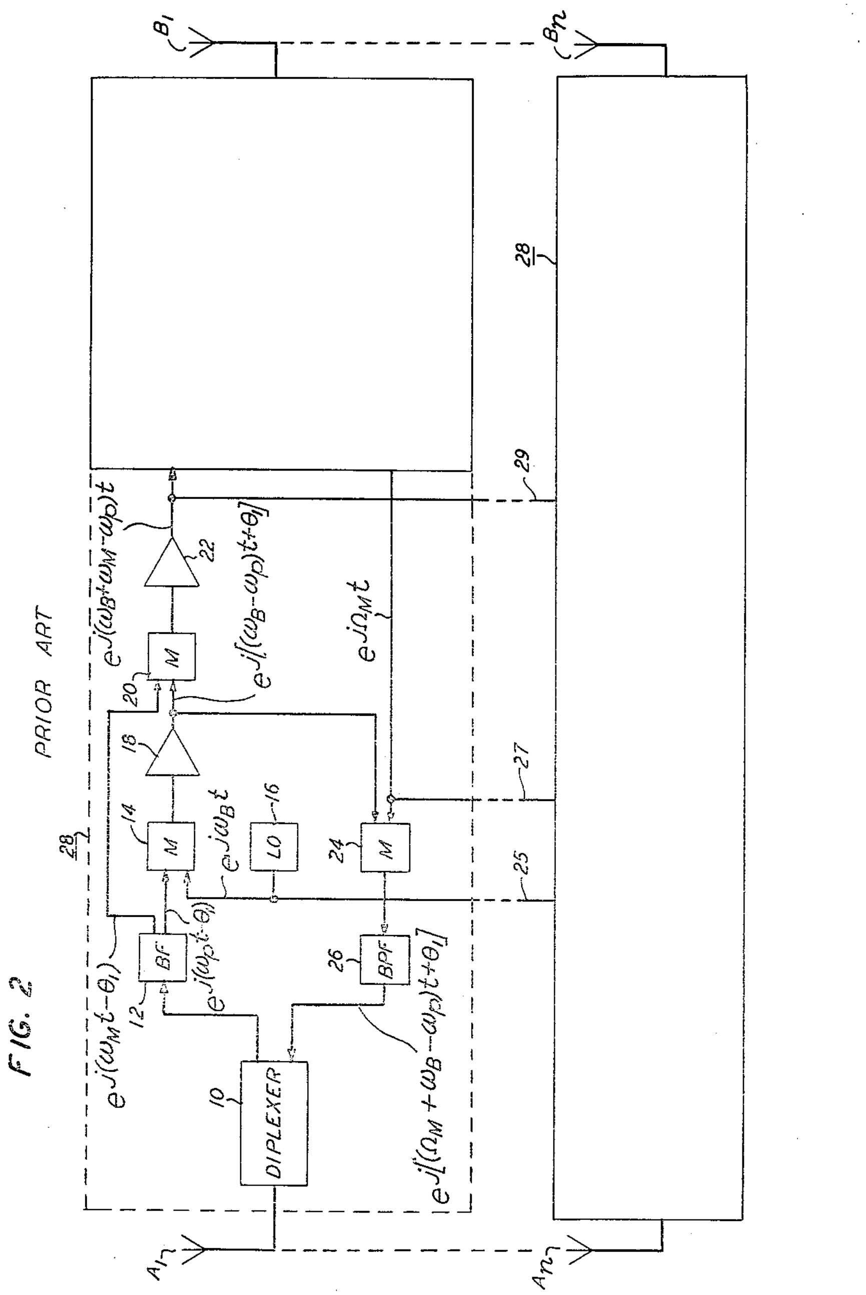
FIG. 2 is a schematic diagram in block form of a communication station disclosed in the above-mentioned Cutler-Kompfner-Tillotson application.

FIG. 2 discloses a repeater shown in the Cutler-Kompfner-Tillotson application which will be used as a basis for comparison with arrangements disclosed herein and embodying the invention. An array of antenna elements $A_1$ through $A_n$ and an array of antenna elements $B_1$ through $B_n$ communicate with remotely located stations (not shown). Blocks 28 contain identical circuitry, part of which associated with element $A_1$ is shown, interconnecting all the corresponding elements of the two arrays and exchanging information between the two remote stations. In operation, a portion of the radio wave intercepted from one of the remote stations by antenna element $A_1$ is applied through a diplexer 10 to a branching filter 12 which separates a pilot component, represented by $e^{j(\omega_P t-\theta_1)}$, where $\omega_P$ equals $2\pi$ times the pilot frequency, $t$ equals time, and $\theta_1$ equals the phase of the portion intercepted by element $A_1$ with respect to some arbitrary reference and an information component, represented by $e^{j(\omega_M t-\theta_1)}$, where $\omega_M$ equals $2\pi$ times the center frequency of the information component. The pilot component can be generated at the remote source as an unmodulated sine wave signal removed in frequency from the information component and transmitted to the array or it can be developed at the array from a portion of the carrier of the information component by filtering. The pilot component is applied to a mixer 14 where it is beat with the output of a local oscillator 16, represented by $e^{j\omega_B t}$, where $\omega_B$ equals $2\pi$ times the local oscillator frequency and is larger than $\omega_P$. The output from local oscillator 16 is also applied to mixers similar to mixer 14 in the other blocks 28 by a bus 25. The difference frequency sideband produced by mixer 14, represented by $e^{j[(\omega_B-\omega_P)t+\theta_1]}$, is amplified and isolated by an amplifier 18 and coupled both to a mixer 20 and a mixer 24.

This sideband, it will be noted, has a phase angle which is equal in magnitude and opposite in sense, with respect to some reference, to that of the portion of the wave intercepted by antenna element $A_1$. In mixer 24 this sideband is beat with an information signal to be conveyed to one of the remote sources, represented by $e^{j\Omega_M t}$, where $\Omega_M$ equals $2\pi$ times the center frequency of the information. The same information signal is applied to all of blocks 28 by a bus 27. The sum frequency sideband developed by mixer 24, represented by $$e^{j[(\Omega_M+\omega_B-\omega_P)t+\theta_1]}$$

is separated by a bandpass filter 26 after which it is applied through diplexer 10 to antenna element $A_1$ for radiation. The signals radiated from antenna elements $A_1$ through $A_n$ are designed to be equal in frequency and their phasse angles are all equal in magnitude and opposite in sense to the corresponding properties of those portions of the impinging wave intercepted by antenna elements $A_1$ through $A_n$. Thus, directional transmission toward the remote source occurs from the array. Schemes to permit transmission from the array of a wave differing in frequency from the impinging wave, which may be utilized in the embodiments shown in this application, are disclosed in the Cutler-Kompfner-Tillotson application.

The portion of the output from amplifier 18 applied to mixer 20 is beat therein with the information component separated by branching filter 12. The resulting sum frequency sideband, represented by $e^{j(\omega_B+\omega_M-\omega_P)t}$, is in the radio frequency range, and must be beat in another mixer, not shown, if handling is to be facilitated by practicing intermediate frequency conversion. This sideband is separated, amplified by an amplifier 22 after which, being in phase with similar sidebands of other of blocks 28, it is combined therewith by means of a bus 29. By duplication of elements 10, 12, 14, 16, 18, 20, 22, 24, and 26 in the right side of block 28 the processed information represented by $e^{j(\omega_B+\omega_M-\omega_P)t}$, can be prepared for transmission by the array of antenna elements $B_1$ through $B_n$ to the other remote station and the information represented by $e^{j\Omega_M t}$ and appearing on bus 27 can be processed from a wave from the other remote station impinging upon the array composed of elements $B_1$ through $B_n$.

Figure 1:
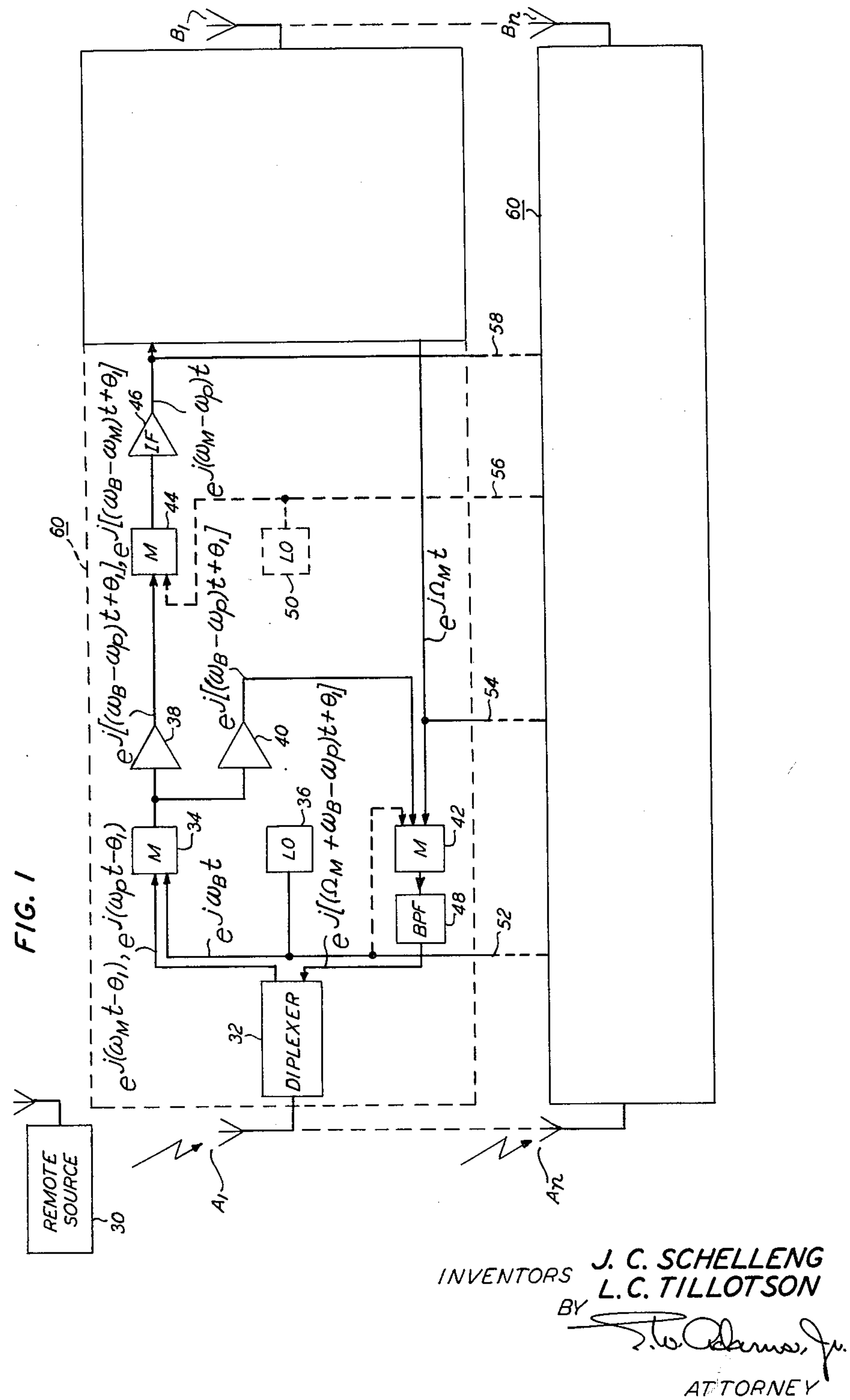
FIG. 1 is a schematic diagram in block form of a communication station in accordance with the invention.

FIG. 1 shows a modification of the Cutler-Kompfner-Tillotson repeater disclosed in FIG. 2 and illustrates the principles of the invention. A remotely located source 30 of radio waves illuminates antenna elements $A_1$ through $A_n$ of an array. Each element of the array is linked to a corresponding element of an array composed of elements $B_1$ through $B_n$, communicating with another remote station (not shown), by circuitry in blocks 60, part of which is shown in the block 60 associated with element $A_1$. Antenna element $A_1$, for example, intercepts a portion of the impinging wave composed of pilot and information components. This portion, represented by $e^{j(\omega_P t-\theta_1)}$ and $e^{j(\omega_M t-\theta_1)}$, is applied through a diplexer 32 to a mixer 34 in which it is beat with the output from a local oscillator 36, represented by $e^{j\omega_B t}$, where $\omega_B$ is larger than $\omega_P$. The difference frequency sideband of the pilot component, represented by $e^{j[(\omega_B-\omega_P)t+\theta_1]}$, is isolated and amplified by an amplifier 40 after which it is applied to a mixer 42. The difference frequency sidebands of both the pilot and information components, represented by $e^{j[(\omega_B-\omega_P)t+\theta_1]}$ and $e^{j[(\omega_B-\omega_M)t+\theta_1]}$, respectively, are separated and amplified 38 the output of which is connected to a mixer 44. In mixer 44 these two sidebands are beat with each other and the difference frequency sideband thus produced, represented by $e^{j(\omega_M-\omega_P)t}$, is an intermediate frequency signal. The absence of a phase angle in the expression signifies that this signal is in phase with similar signals developed by the other antenna elements of the "A" array. This intermediate frequency information signal is amplified and separated by an intermediate frequency amplifier 46 and combined with similar signals of the other blocks 60 by a bus 58. An optional addition to permit relaxation of the bandwidth tolerance of the intermediate frequency equipment to lessen the constraints on the frequency plan of a large radio relay system employing the arrangement (refer to the article commencing on page 1505 of the November, 1960 issue of the Bell System Technical Journal for a detailed consideration of the frequency plan of a system) is shown in a dashed outline. The output from an intermediate frequency local oscillator 50 is beat with the pilot and information components in mixer 44 and is also applied to the other blocks 60 by a bus 56. Here, a third order sideband having the desired phase characteristic is the one separated by amplifier 46 and combined by bus 58.

The output of amplifier 40 is beat in mixer 42 with information to be radiated toward source 30, represented by $e^{j\Omega_M t}$, which information also is applied by a bus 54 to the other blocks 60 for radiation from their respective antenna elements of the "A" array. The resulting sum frequency sideband, represented by $e^{j[(\Omega_M+\omega_B-\omega_P)t+\theta_1]}$ and in substantially the frequency range of the impinging wave, is separated by a bandpass filter 48 and radiated from antenna element $A_1$ after passing through diplexer 32. More flexibility in the frequency of transmission from antenna elements $A_1$ through $A_n$ can be obtained by beating a local oscillator signal, shown applied by a dashed line, in mixer 42 and radiating a third order sideband having the desired phase characteristic. Duplication of compents 32, 34, 36, 38, 40, 42, 44, 46, and 48 on the right side of block 60 permits development of the information appearing on bus 54 from a wave impinging upon antenna elements $B_1$ through $B_n$ from an unshown remote source and transmission of the information signal carried by the wave intercepted by antenna elements $A_1$ through $A_n$ toward the unshown source from antenna elements $B_1$ through $B_n$. If the invention is to be practiced in a terminal station instead of a repeater, bus 58 would lead to a local utilization circuit and bus 54 would lead to a local source of information.

It should be noted that the arrangement of FIG. 1, although it provides intermediate frequency conversion of the information signals, employs the same number of mixers as the prior art configuration of FIG. 2.

Figure 3:
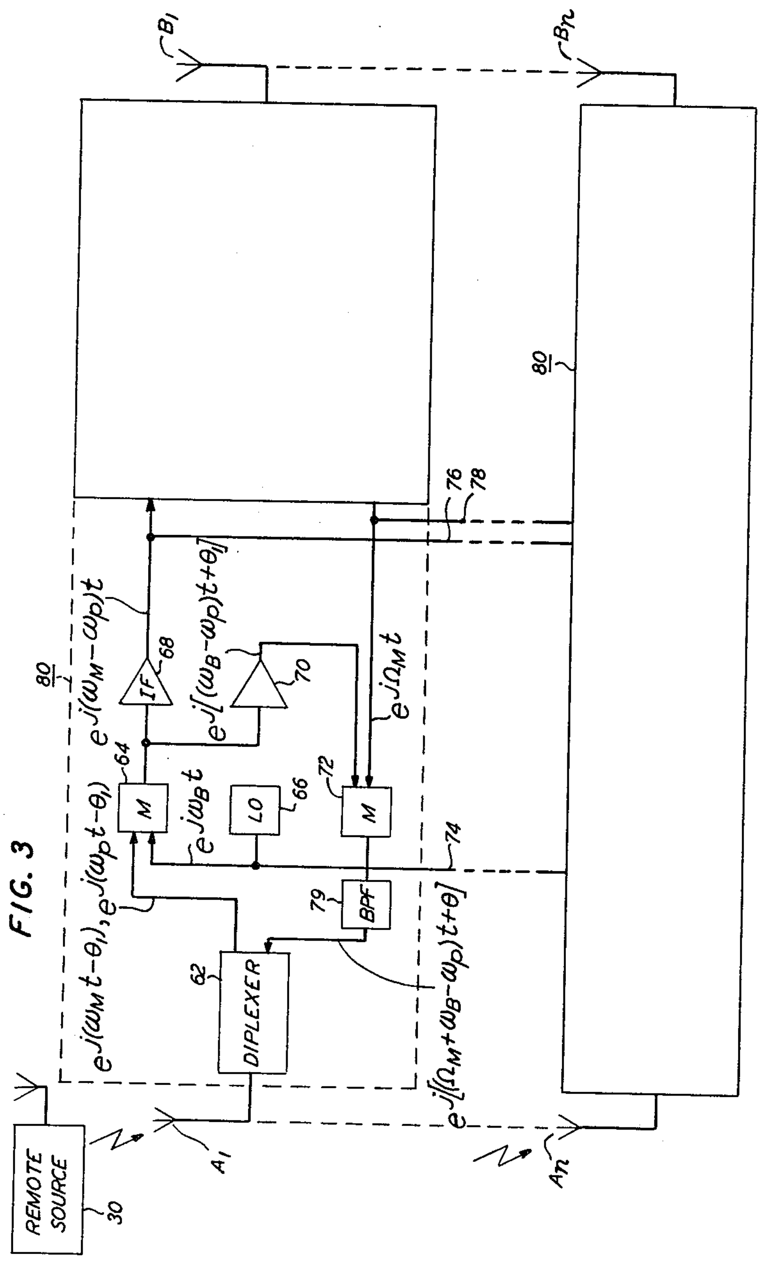
FIG. 3 is a schematic diagram in block form of a second communication station embodying the invention.

FIG. 3 discloses another embodiment of the invention, shown in one of identical blocks 80, that realizes an actual reduction in circuit components over the prior art arrangement of FIG. 2. Antenna element $A_1$ here intercepts a portion of the wave from remote source 30 which is coupled through a diplexer 62 to a mixer 64. The intercepted portion, represented by $e^{j(\omega_M t-\theta_1)}$ and $e^{j(\omega_P t-\theta_1)}$, is beat with the output from a local oscillator 66, represented by $e^{j\omega_B t}$. The difference frequency sideband, represented by $e^{j[(\omega_B-\omega_P)t+\theta_1]}$, is separated and amplified by an amplifier 70 and applied to a mixer 72 where it is beat with information, represented by $e^{j\Omega_M t}$, appearing on a bus 78. The resulting sum frequency sideband, represented by $e^{j[(\Omega_M+\omega_P-\omega_B)t+\theta_1]}$ and in substantially the same frequency range as the impinging wave, is separated by a bandpass filter 79 and applied to diplexer 62 for radiation from antenna element $A_1$.

Another, sideband produced in mixer 64, represented by $e^{j(\omega_M-\omega_P)t}$, contains the information transmitted from source 30 converted to intermediate frequency and is in phase with similar signals developed by the other blocks 80. This sideband is amplified and isolated by an intermediate frequency amplifier 68, connected to a bus 76 for distribution among all of blocks 80. In this embodiment the functions of both mixers 34 and 44 (FIG. 1) are consolidated in mixer 64.

The invention can be practiced in connection with any of the arrangements disclosed in the above-cited Cutler-Kompfner-Tillotson application. In addition, it can be practiced with a system wihch does not radiate a pilot component from the remote source but which instead derives the pilot component at the repeater from the information component of the impinging wave, such as the arrangement disclosed in an application of L. H. Enloe, Serial No. 220,010, filed August 28, 1962, and assigned to the assignee of the present invention.

What is claimed is:

1. In a communication system, an array of antenna elements, a source of information-bearing electromagnetic waves for irradiating said array, combining means, and apparatus individual to each antenna element comprising means for recovering an information component and an unmodulated sine wave signal to serve as a pilot component from the portion of said wave impinging upon said element, means for mixing said information component with said pilot component, and means for applying the difference frequency side band resulting from said mixing means to said combining means.

2. A communication system comprising an array of antenna elements, a source of electromagnetic waves for irradiating said array remotely located from said array, the waves from said source including an information component and a pilot component, combining means for said information component, and apparatus individual to each antenna element comprising means for recovering a portion of said wave impinging upon said element, means for mixing together the information component and the pilot component of said portion, and means for applying the difference frequency side band resulting from said mixing means to said combining means.

3. In a communication system, an array of antenna elements, a source of electromagnetic waves carrying information, a source of information to be transmitted toward said source of electromagnetic waves, a local oscillator the frequency of which is greater than the frequency of said wave, and apparatus associated with each antenna element comprising means for recovering an information component and an unmodulated sine wave signal to serve as a pilot component from the portion of said wave intercepted by said antenna element, a first mixer for beating said information component and said pilot component with the output of said oscillator, the difference frequency sideband of said information component resulting from said first mixer being at an intermediate frequency, a second mixer for beating the output from said source of information to be transmitted with the difference frequency sideband of said pilot component resulting from said first mixer, and means for applying the sum frequency sideband resulting from said second mixer to said antenna element.

4. In a communication system, an array of antenna elements, a source of electromagnetic waves having a pilot component and an information component, a source of information to be transmitted toward said source of electromagnetic waves, a local oscillator the frequency of which is greater than the frequency of said wave, and apparatus associated with each antenna element comprising means for recovering the portion of said wave impinging upon said antenna element, a first mixer for beating said information component and said pilot component with the output of said oscillator, the difference frequency sideband of said information component resulting from said first mixer being at an intermediate frequency, a second mixer for beating the output from said source of information to be transmitted with the difference frequency sideband of said pilot component resulting from said first mixer, and means for applying the sum frequency sideband resulting from said second mixer to said antenna element.

5. A communication system comprising a plurality of antenna elements arranged in an array, a source of electromagnetic waves carrying information and irradiating said array, a source of information to be transmitted toward said source of electromagnetic waves, utilization means, a local oscillator the frequency of which is greater than the frequency of said wave, and apparatus associated with each antenna element comprising means for recovering an information component and an unmodulated sine wave signal to serve as a pilot component from the portion of said wave intercepted by said antenna element, means for beating said information component with said pilot component, and said pilot component with the output from said local oscillator, means for applying the difference frequency sideband resulting from beating said information component with said pilot component to said utilization means, means for beating with the output from said source of information to be transmitted the difference frequency sideband resulting from beating said pilot component with the output of said local oscillator, and means for applying the sum frequency sideband resulting from said last-mentioned beating means to said antenna element.

6. In a communication system, an array of antenna elements, a remotely located source of electromagnetic waves for illuminating said array, said waves comprising an information component and a pilot component, a source of information to be radiated toward said remote source, a local oscillator the frequency of which is greater than the frequency of said wave, and circuitry individual to each antenna element comprising means for recovering a portion of said wave impinging upon said antenna element, first means for mixing said wave with the output from said local oscillator, second means for mixing the difference frequency sideband of the pilot component of said wave resulting from said first mixing means with the output from said source of information to be radiated, means for applying the sum frequency sideband resulting from said second mixing means to said antenna element, third means for mixing the pilot component and the information component of the difference frequency sideband resulting from said first mixing means, and means for combining the sum frequency sideband resulting from said third mixing means with similar quantities derived by the remaining antenna elements.

7. An antenna system comprising a plurality of antenna elements arranged in an array, a source of information-bearing electromagnetic waves for irradiating said array, utilization means, a source of information to be radiated toward said source of said wave, a local oscillator the frequency of which is greater than the frequency of said wave, and circuitry associated with each of said antenna elements comprising means for recovering an information component and an unmodulated sine wave signal serving as a pilot component from the portion of said wave impinging upon said antenna element, means for mixing said information component and said pilot component of said portion with the output of said local oscillator, means for applying the difference frequency sideband of said information component and said pilot component to said utilization means, means for mixing the difference frequency sideband of said local oscillator output and said pilot component with the output from said source of information to be radiated, and means for applying to said antenna element the sum frequency sideband resulting from said last-mentioned mixing means.

References Cited in the file of this patent

UNITED STATES PATENTS 3,036,210 Lehan et al. ------------ May 22, 1962

UNITED STATES PATENT OFFICE

CERTIFICATE OF CORRECTION

Patent No. 3,166,749 January 19, 1965

John C. Schelleng et al.

It is hereby certified that error appears in the above numbered patent requiring correction and that the said Letters Patent should read as corrected below.

In the grant, lines 2 to 4, for ", assignors to Bell Telephone Laboratories, Incorporated, of New York, N. Y., a corporation of New York," read -- ; said Tillotson assignor to Bell Telephone Laboratories, Incorporated, of New York, N. Y., a corporation of New York, --; line 13, for "Bell Telephone Laboratories, Incorporated, its successors" read -- John C. Schelleng, his heirs or assigns and Bell Telephone Laboratories, Incorporated, its successors --; in the heading to the printed specification, lines 5 to 7, for ", assignors to Bell Telephone Laboratories, Incorporated, New York, N. Y., a corporation of New York" read -- ; said Tillotson assignor to Bell Telephone Laboratories, Incorporated, New York, N. Y., a corporation of New York --.

Signed and sealed this 6th day of July 1965.

(SEAL)
Attest:

ERNEST W. SWIDER
Attesting Officer

EDWARD J. BRENNER
Commissioner of Patents